United States Patent [19]

Giacomello

[11] Patent Number: 4,541,181
[45] Date of Patent: Sep. 17, 1985

[54] METAL TAPE TRANSDUCER FOR THE MICROMETRIC MEASUREMENT LINEAR QUANTITIES

[76] Inventor: Giacomo G. Giacomello, Via Domenichino, 50, 20149 Milano, Italy

[21] Appl. No.: 525,879

[22] Filed: Aug. 24, 1983

[30] Foreign Application Priority Data

Sep. 3, 1982 [IT] Italy ................. 23117 A/82

[51] Int. Cl.$^4$ .............................................. G01B 11/04
[52] U.S. Cl. ................................. 33/125 C; 250/237 G
[58] Field of Search ............ 33/125 R, 125 A, 125 C, 33/125 T, DIG. 3, DIG. 7; 250/237 G

[56] References Cited

U.S. PATENT DOCUMENTS

| | | | |
|---|---|---|---|
| 3,658,429 | 4/1972 | Zipin | 33/125 C |
| 3,816,002 | 6/1974 | Wieg | 33/125 C |
| 4,060,903 | 12/1977 | Ernst | 33/125 C |
| 4,170,826 | 10/1979 | Holstein | 33/125 C |

FOREIGN PATENT DOCUMENTS

| | | | |
|---|---|---|---|
| 2911047 | 10/1980 | Fed. Rep. of Germany | 33/125 T |
| 2078966 | 1/1982 | United Kingdom | 33/125 R |

*Primary Examiner*—Richard R. Stearns
*Attorney, Agent, or Firm*—Stevens, Davis, Miller & Mosher; Stevens, Davis, Miller & Mosher

[57] ABSTRACT

The invention relates to a transducer for the micrometric measurement of linear quantities comprising a support rule, a scale in the form of a very thin continuous metal tape which is kept suspended at its ends under a predetermined constant tension and on which the measurement notches are directly engraved, and a reading head comprising a tape guide groove in which the tape slides freely during the movement of the head relative to the support rule.

7 Claims, 5 Drawing Figures

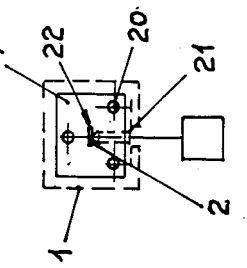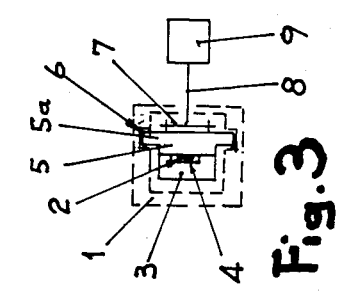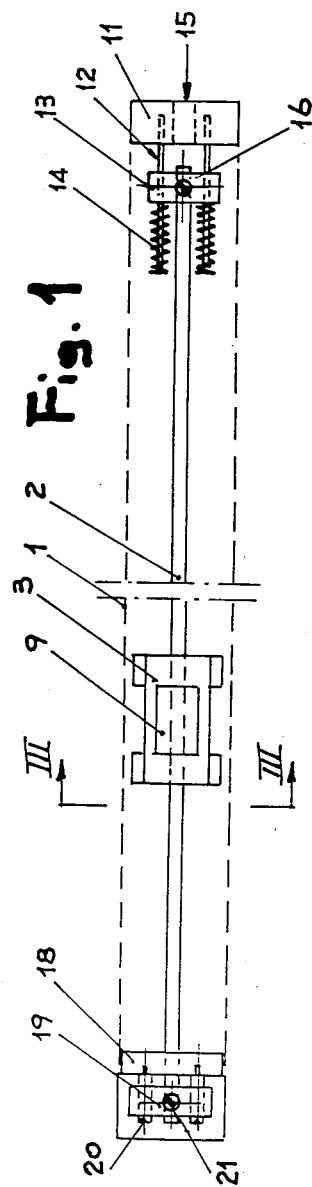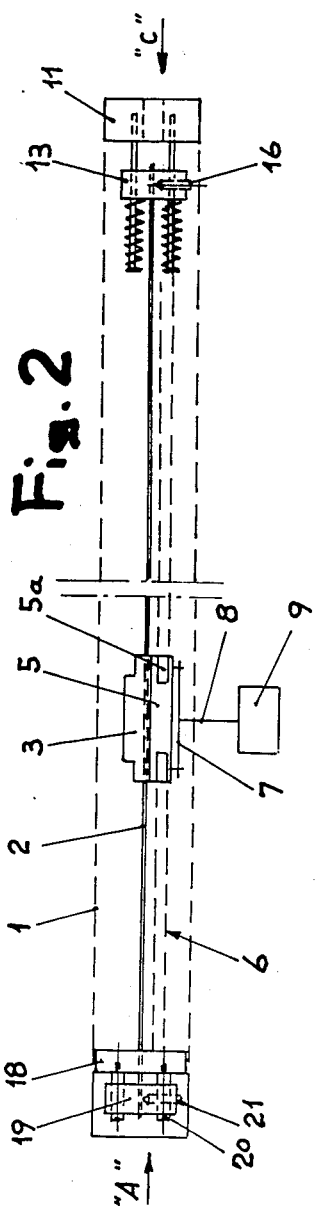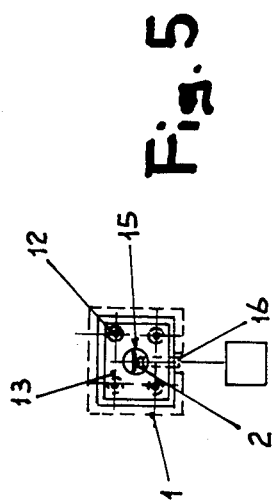

METAL TAPE TRANSDUCER FOR THE MICROMETRIC MEASUREMENT LINEAR QUANTITIES

BACKGROUND OF THE INVENTION

1. Field of the Invention

In the present state of the art, in order to measure linear quantities with micrometric accuracy and discrimination, it is known to use, inter alia, linear measurement transducers mainly based on the following incremental measuring systems:

(a) interferometric, by means of a laser beam, in which the size of the incremental measurement unit is determined in relation and proportion to the wavelength of the beam used;

(b) inductive and/or capacitive, in which the size of the incremental measurement unit is generally obtained by measurement and sinusoidal interpolation of the intensity of the high frequency electrical or magnetic field produced by a linear inductor having its poles spaced apart by a length equal to a multiple of the size of the incremental measurement unit;

(c) optoelectronic, using an optical rule, in which the size of the incremental measurement unit is determined by equidistant micrometric notches engraved on a glass or metal scale at a spacing equal to the measurement unit or a multiple thereof, and such as to be able to be intercepted optoelectronically.

For industrial use, such linear measurement transducer are classified as follows in terms of their particular application characteristics:

(a) interferometric system: usable for measurements up to and beyond 30 meters, generally with a discrimination of 1 $\mu$m or less;

(b) induction system: usable for measurements up to 10 meters with a discrimination of 10 $\mu$m and 5 $\mu$m, and for shorter lengths with a discrimination of up to 1 $\mu$m;

(c) optoelectronic system: usable for measurements up to 20 meters with a discrimination of 10 $\mu$m and/or 5 $\mu$m, and for lengths up to 3 meters with a discrimination of 1 $\mu$m.

2. Description of the Prior Art.

The optoelectronic system—which uses glass or metal optical scales—is at present applied industrially to a greater extent than the other two systems, in particular in the field of machine tools and manufacturing machines in general.

In this measurement system, the measurement rule is universally constructed, as already stated, with a notched scale consituted by a precision-machined mechanically rigid glass or metal bar, with micrometric notches disposed transversely to its longitudinal axis, and such as to allow—by sensing, by transparency or reflection, the moire fringes produced by optical interference with an equivalent grid of notches on the reading cursor—the formation of electrical pulses of a number equal to the number of incremental units scanned over the length travelled by the reading cursor, and of concordant phase with the direction of measurement.

More particularly, in measuring systems of this type, to which the present invention relates, the transducer comprises two functionally inseparable essential parts, namely:

the measurement scale, constituted by a perfectly rectilinear element, of which the surface carries the engraved measurement notches which can be sensed optically either by transparency or by reflection, and the reading head, which is mobile along the scale and is arranged to intercept the passage of the scale notches by transparency or optical reflection, and to provide electrical pulses of a sequence and phase which are concordant with the relative movement between scale and the head, these pulses then being used for controlling bidirectional electronic counters and/or apparatus for monitoring and controlling machine tools, such as "dimensions display units", "positioners", "numerical controls" and the like.

According to the known art, nearly all measurement transducers using linear scales of the engraved notch type are constructed with a glass or stainless steel scale in the form of a rectilinear bar of rigid structure. This bar has a fairly large cross-section to enable it to be fixed by screw means or the like over its entire length in a seat provided in a so-called support rule, this generally being in the form of an extruded aluminium section, and serving as a support and slide guide for the reading head.

The steel or glass bar which forms the scale has generally a rectangular cross-section $>>10$ mm$^2$, so as to be mechanically rigid, as already stated. In this respect, it must also act as the guide for the reading head in cooperation with the support rule over the entire length of said scale, so as to ensure precise alignment of the head with the scale axis, both in the azimuthal and zenithal directions.

In the present state of the art it is not economically possible to manufacture linear transducers with a glass or steel scale for lengths exceeding 2 or 3 meters without any discontinuity, and such transducers are therefore constructed by fixing two or more aligned bars on to the support rule.

This scale alignment method involves technological and production difficulties, and manufacturing costs which are greater the greater the length of the transducer.

In order to obviate thse difficulties, it has already been proposed to engrave the measurement notches on a flexible steel strip which is not under tension, and to then glue this strip on to a rigid support bar.

This obviously simplifies manufacture from the point of view of maintaining an exact distance between the notches over the entire length of the scale. However, the support bar must be again manufactured in the form of several precision-machined pieces, of which the assembly involves the same alignment difficulties, with consequent formation of undulations in the strip which can then generate reading errors.

SUMMARY OF THE INVENTION

The object of the present invention is to resolve and obviate the known technical and technological limitations inherent in optical rule transducers of length exceeding 2 meters which use a rigid glass or steel scale. In this respect, the invention provides an optical rule structure, of which the scale has no discontinuity, even when of considerable length such as greater than 10 meters, and which can be manufactured and assembled very easily and at low cost.

This result is principally attained in that the transducer according to the invention comprises on the one hand a scale in the form of a very thin continuous metal tape which is kept taut and suspended at its ends between two connection points on the support rule, is subjected to a predetermined tension, and has the measurement notches directly engraved on it, and on the other hand a measurement head comprising a guide groove for the tape, in which this latter slides freely during the relative movement between the reading head and the optical rule.

More particularly, and according to one characteristic of the invention, the continuous metal tape has a cross-section which is less than 1 mm² and a width/thickness ratio of between 20 and 100.

BRIEF DESCRIPTION OF THE DRAWINGS

Further characteristics and advantages of the transducer structure according to the present invention will be more apparent from the description of one embodiment thereof given hereinafter by way of example and illustrated on the accompanying drawings, in which:

FIG. 1 is a diagrammatic plan view of the transducer accoding to the invention;

FIG. 2 is a side elevational view of the transducer according to the invention;

FIG. 3 is a cutaway view on line III—III of FIG. 1 rotated 90° clockwise;

FIGS. 4 and 5 are diagrammatic views respectively of the left and right end of FIG. 2.

DESCRIPTION OF THE PREFERRED EMBODIMENT

As shown, the trasducer comprises a support rule 1 indicated only by dashed lines, and on which the support blocks 13 and 19 for the flexible metal tape 2 are mounted.

Along the tape 2, or rather along the rule 1, there slides the reading head which is composed of the optoelectronic sensor 3 fixed to the slide block 5 (see also FIG. 3), and comprising slides 5a slidable in the guide channels 6 of the support rule 1. The box 9 for connection to the external apparatus also forms part of the reading head, and is joined to the sensor 3 by way of the transmission 8 and the swing plate 7. This latter allows the box 9 to make angular movements without any axial sliding of the reading head.

One of the ends of the rule 1 is closed by the plate 11 which connects the block 13. It supports four rods 12 (see also FIG. 5), on which the block 13 is mounted to slide axially.

Springs 14, coaxial to the rods 12 and fixed to the free end thereof, rest on the block 13 and tend to urge it towards the plate 11. One end of the metal tape 2 is fixed on to the block 13, for example by means of a fixing screw 16.

At the other end of the rule 1, the block 19—on which the other end of the tape 2 is fixed, again by means of a fixing screw 21 analogous to the screw 16—is mounted on the cross-member 18 rigid with the wall 1 by simply holding it in positon by means of three adjustment screws 20 (see also FIG. 4).

The tape is assembled as follows: after fixing one end of the tape 2 on to the block 13 and passing the tape through the grooves 4 and 22, the other end of the tape is gripped with a dynamometer.

Traction is then exerted on the tape 2, the value being varied by the dynamometer until the tape is under the predetermined tension, as defined hereinafter, after which the fixing screw 21 is tightened.

When the screw 21 has been tightened and the dynamometer removed, the tension in the tape 2 is maintained by the springs 14, which have been loaded during the same operation.

The assembly can also be carried out by preloading the springs 14 before inserting the tape 2. For this purpose, the block 11 comprises the bore 15 through which, by means of a rod dynamometer, and axial thrust can be exerted on the block 13 against the springs 14 until the prescribed preloading has been attained. The tape is then inserted into the rule and is fixed—while not under tension—at its two ends by tightening the screws 16 and 21 of the blocks 13 and 19. On removing the dynamometer, the tension in the tape 2 is maintained by the springs 14, in equilibrium with the preloading threof.

When the tape has been assembled and tensioned, the final setting of the loading of the springs 14 is effected by adjusting the positon of the block 19 by means of the adjustment screws 20. When assembly is complete, the scale is calibrated by comparison with a primary sample scale, using comparison both in terms of number and phase with the pulses emitted by the sample scale when making the same linear movements as the scale being calibrated. The micro-variations in the length of the scale, which are necessary for calibration purposes, are obtained by adjusting the adjustment screws 20 of the block 19.

According to one important characteristic of the ivention, on assembling the reading head, the tape 2 is passed through a guide groove 4 formed between the slide block 5 and the optoelectronic sensor 3. This guide groove 4 ensures that the tape 2, although being able to slide freely relative to the reading head, is kept in perfect zenithal and azimuthal axial alignment with the optical comparison matrix mounted on the reading head.

The structure heretofore described has been found to perfectly satisfy the requirements of a transducer for the micrometric measurement of linear quantities, with an accuracy of the same order as transducers comprising a scale in the form of a rigid glass or steel bar.

In this respect, according to the basic idea of the present invention, a flexible metal tape of any length (La), and possessing high uniformity, mechanical strength, flexibility and inextensibility characteristics and very low weight per unit of length, can be used as a measurement scale for linear quantities with micrometric accuracy if kept taut at its ends between two substantially fixed and horizontally aligned fixing points p, p', under a force Tr such that the tangent at the fixing points p, p' to the arc (La) described by the tape forms an angle $(\alpha) \leq 0.2°$ with the straight line (Lc) passing through said points.

Taking account of this condition, when the tape is horizontally taut it becomes arranged by gravity as a parabolic arc, of which the length La is equal—less and error $\epsilon_o$—to the length La' of the circular arc tangential to the points p and p' and of radius $$R = \frac{Lc}{2 \sin \alpha}$$

At is can be assumed that $La - La' = \epsilon_o \to 0$ for arcs less than or equal to 0.2°, for practical purposes $\epsilon_o$ can be ignored in the calculation, as $\epsilon_o << \epsilon'$, where $\epsilon' = La - Lc$, ie the difference between the length of the arc La and its chord Lc. Letting $La = La' + \epsilon_o$, it follows that $$La = \frac{\pi R}{180} 2\alpha + \epsilon_o, \text{ and letting } R = \frac{Lc}{2\sin\alpha}, \text{ then}$$

$$La = Lc \frac{\pi\alpha}{180\sin\alpha} + \epsilon_o$$

For practical purposes, it can be considered that $\epsilon_o=0$, so that putting $Lc=1$, then the unit measurement error $$\epsilon_u, \text{ ie } \frac{La - Lc}{Lc},$$

becomes:

$$\epsilon_u = \left( \frac{\pi\alpha}{180\sin\alpha} - 1 \right) = \mu/m$$

which, resolving as a function of $\alpha$, gives:

TABLE (A)

| $(\alpha)$ | $(\epsilon_u)$ |
|---|---|
| 0.07° | 0.33 µ/m |
| 0.10° | 0.57 µ/m |
| 0.15° | 1.18 µ/m |
| 0.20° | 2.04 µ/m |

Consequently, in order to contain the measurement error within the limits of $$\epsilon_u = 3.3 \times 10^{-7}/m \text{ and } \epsilon_u = 2 \times 10^{-6}/m$$

according to the principles of the invention, the angle $\alpha$ of tangency between the arc La and the chord Lc can be chosen between 0.07° and 0.2°, which is obviously compatible with the physical strength characteristics of the tape used.

Within the indicated limits of the angle $\alpha$, i.e. $\leq 0.2°$, the parabolic arc described by the thin tape of weight P tends to coinincide with the circular arc of radius $$R = \frac{Lc}{2\sin\alpha}$$

when subjected to a tension Tr, and thus respective heights F of the parabolic arc and F' of the circular arc under consideration also become approximately equal, so that putting $$F = \frac{P(Lc)^2}{8Tr} \text{ and}$$

$$F' = R(1 - \cos\alpha) = \frac{Lc}{2\sin\alpha} (1 - \cos\alpha),$$

then if $F = F'_2 + \epsilon$,

-continued $$\frac{F}{F + \epsilon} = \frac{P(Lc)^2}{8Tr} / \frac{Lc}{2\sin\alpha} (1 - \cos\alpha) + = 1$$

from which, considering that $\epsilon \to 0$, the tensioning force Tr of the tape becomes $$Tr = \frac{P.Lc.\sin\alpha}{4(1 - \cos\alpha)} \quad \text{(B)}$$

where $Tr \leq Ts$, Ts being equal to $$\sigma p.S/0.0033 \quad \text{(C)}$$

where
  F=height of arc La in mm
  P=weight of tame in g/m
  Lc=length of scale in m
  Tr=tensioning force in grams
  Ts=maximum applicable tensioning force in grams (stability condition)
  $\epsilon = F - F'$
  $\sigma p$=elastic limit ($\sigma_{0.01\%}$) in kg/mm²
  S=tape cross-section in mm²

On the basis of these observations, transducer scales were tested using stainless steel tape (nominal analysis in %: Cr 17; Ni 8, C 0.09; Si 1.2; Mn 1.3; Mo 0.7) of gauged thickness, having the following characteristics at 20° C.:
  ultimate tensile strength: 2050 N/mm²
  yield strength (0.2%): 1950 N/mm²
  elastic limit ($\sigma_{0.01\%}$): 1100 N/mm²
  modulus of elasticity: 180,000 N/mm²
  modulus of rigidity: 70,000 N/mm²
  surface state: specular Using a metal tape of this type, transducers were constructed for example of length up to 10 meters with tapes of the following dimensions:

| (1) width: 5.6 mm | thickness: 50 µm |
|---|---|
| cross-section: 0.28 mm² | weight: 2.15 g/m |
| (2) width: 5.6 mm | thickness: 100 µm |
| cross-section: 0.56 mm² | weight: 4.3 g/m |

The following were engraved transversely to the longitudinal axis on these tapes, which were produced initially of indefinite length:
  25,000 notches/meter: spaced apart by 20 µm or
  50,000 notches/meter: spaced apart by 10 µm with a notch length of 2.5 mm.

Each of these tapes—mounted on the support rule 1 in the aforesaid manner and subjected to a tension T calculated in the manner indicated, and such in each case as to reduce the error $\epsilon_u$ to the values given in Table A—was perfectly suitable for use as a micrometric scale for precision transducers.

By way of example, the following Table D gives data determined on transducers constructed in accordance with the invention, compared with calculated data. This table relates to test transducers of a maximum length of 10 m, for different tensions of the tape used, which had an elastic limit $\sigma_{0.01\%}$ of 111 kg/m².

TABLE D

| | Ex. 1 | Ex. 2 | Ex. 3 | Ex. 4 | Ex. 5 | Ex. 6 |
|---|---|---|---|---|---|---|
| Tape section, mm² | 0.28 | 0.56 | 0.28 | 0.56 | 0.28 | 0.56 |
| Error $\epsilon_u = \mu/m$ | | | | | | |
| calculated | 0.33 | 0.33 | 0.57 | 0.57 | 1.18 | 1.18 |
| measured (1) | 1 | 1 | 1 | 1 | 1.5 | 1.5 |
| Tape tension | | | | | | |

TABLE D-continued

|  | Ex. 1 | Ex. 2 | Ex. 3 | Ex. 4 | Ex. 5 | Ex. 6 |
|---|---|---|---|---|---|---|
| Tr/Lc = g/m |  |  |  |  |  |  |
| calculated | 880 | 1760 | 615 | 1230 | 410.5 | 821 |
| applied | 880 | 1760 | 615 | 1230 | 410 | 820 |
| Ratio Tr/P | 409 | 409 | 286.5 | 286.5 | 190.7 | 190.7 |
| (2) Max length executed Lc(e) in m | 5 | 5 | 10 | 10 | 10 | 10 |
| (3) Max length obtainable Lc(s) in m | 11.5 | 11.5 | 15.5 | 15.5 | 23.2 | 23.2 |
| Applied force (in kg) Tr = | 4.4 | 8.8 | 6.15 | 12.3 | 4.10 | 8.21 |
| Deflection at center F/Lc(e) in mm/m | 0.3 | 0.3 | 0.45 | 0.45 | 1.0 | 1.0 |
| Max tens. ratio Ts/Tr (in %) | 46 | 46 | 65 | 65 | 43 | 43 |

NOTES:
(1) determined on scales of length Lc = 1 m and Lc = 2 m.
(2) maximum length tested in m.
(3) maximum length obtainable where Tr = Ts.

As the tape scale remains permanently under tension with a force of Tr when installed in the support rule, this tensioning load must also be applied to the tape during the engraving process of the measurement notches in order obviously to nullify the effect on measuring accuracy of the elongation due to the tensioning.

Taking account of this, as the degree of elongation depends on the tension Tr, the minimum error condition ($\epsilon_u$/m) is obtained for example as follows.

The value of Tr for a given weight P of the tape of length Lc is defined on the basis of formula (B). The notches are then engraved while maintaining the tape under tension with a force T'r=Tr; the error in the length of the engraved tape—which in the case of a non-tensioned tape is $\epsilon'_u = \epsilon_u -$ Elong/m (where Elong/m is the tape elongation per meter under the tension T'r)—becomes equal to the scheduled error $\epsilon_u$ when the tape is subsequently tensioned when mounted in the support rule, so that Tr−T'r=0.

Thus as seen from Table D, the measurement error deriving from the arcuate arrangement of the metal tape remains contained within the limits which are normally scheduled and obtained in known linear transducers using a scale in the form of a rigid glass or metal bar.

In contrast, the construction of an optoelectronic rule such as that described with reference to the drawings is considerably simplified. In particular, the constructional difficulty is partically independent of the length of the rule. From the cost aspect, this means a reduction in manufacturing cost to a minimum of ⅓ in the case of small optical rules (up to 2 meters), down to as little as 1/10 in the case of larger optical rules (up to 10 meters and beyond).

The invention is not limited to the particular embodiment illustrated and described, and various modifications can be made thereto all of which are within the scope of an expert of the art and all of which consequently fall within the range of protection of the invention itself.

I claim:

1. A transducer for the micrometric measurement of linear quantities, of the type comprising a support rule having ends, a thin continuous metal tape of cross-section less than 1 mm² on which a plurality of measurement notches are engraved at regular micrometric intervals, said notches being engraved while said tape is under a tension at which the tape is to be maintained, and which is fixed to said support rule, a reading head which moves axially relative to the tape in order to sense the measurement notches, said reading head being supported slidably along said support rule, means at the ends of said support rule to suspend and keep taut ends of the tape under a predetermined constant tension, said reading head comprising a guide groove coaxial to the tape, in which the tape slides freely when the head moves relative to the tape.

2. A transducer as claimed in claim 1, wherein the continuous metal tape has a cross-section which is between 0.2 and 1.0 mm², and a width/thickness ratio of between 20 and 100, the measurement notches being engraved on one of its surfaces.

3. A transducer as claimed in claim 1, wherein the metal tape is constituted by a very thin continuous metal tape having at least one specular surface and prepared by cold-rolling a chromium-containing austenitic stainless steel alloy, and possessing the following physical characteristics at 20° C.:

ultimate tensile stress > 1900 N/mm²
yield resistance (0.22%) > 1900 N/mm²
modulus of elasticity > 175,000 N/mm²
modulus of rigidity > 70,000 N/mm²
elastic limit ($\sigma_{0.01\%}$) > 1100 N/mm².

4. A transducer as claimed in claim 1, wherein said means tension the thin metal tape sufficiently to cause said tape to undergo a small elastic elongation.

5. A transducer as claimed in claim 4, wherein said means exercise a tensioning force on the tape of between 100 and 400 times its total weight, or a tensioning force Tr which, expressed in grams, is given by the formula $$Tr = \frac{P.Lc.\sin\alpha}{4(1 - \cos\alpha)} \leq \frac{\sigma_p.S}{0.0033}$$

where:
$\sigma_p$ = elastic limit ($\sigma_{0.01\%}$) in kg/mm²
S = tape cross-section in mm²
Lc = tape scale length in m
P = tape weight in g/m
$\alpha$ = angle (between 0.07° and 0.2°) formed between the straight line joining the two tape fixing points in the horizontal direction, and the tangent to said tape at one of these points.

6. A transducer as claimed in claim 1, wherein said means includes a block slidable along the axis of said tape, and springs applied against said block to provide the tape tensioning load.

7. A transducer as claimed in claim 1, wherein said means includes a support block for one end of said tape and adjustment screws to adjust the position of said tape along the tape axis.

* * * * *